(12) United States Patent
Takaoka et al.

(10) Patent No.: US 11,149,412 B2
(45) Date of Patent: Oct. 19, 2021

(54) CONTROL SYSTEM FOR WORK MACHINE, METHOD, AND WORK MACHINE

(71) Applicant: KOMATSU LTD., Tokyo (JP)

(72) Inventors: Yukihisa Takaoka, Tokyo (JP); Kazuki Kure, Tokyo (JP)

(73) Assignee: KOMATSU LTD., Tokyo (JP)

( * ) Notice: Subject to any disclaimer, the term of this patent is extended or adjusted under 35 U.S.C. 154(b) by 66 days.

(21) Appl. No.: 16/632,967

(22) PCT Filed: Nov. 22, 2018

(86) PCT No.: PCT/JP2018/043226
§ 371 (c)(1),
(2) Date: Jan. 22, 2020

(87) PCT Pub. No.: WO2019/116855
PCT Pub. Date: Jun. 20, 2019

(65) Prior Publication Data
US 2020/0157773 A1    May 21, 2020

(30) Foreign Application Priority Data
Dec. 14, 2017    (JP) .............................. JP2017-239774

(51) Int. Cl.
*E02F 9/26* (2006.01)
*E02F 3/84* (2006.01)
(Continued)

(52) U.S. Cl.
CPC .............. *E02F 9/262* (2013.01); *E02F 3/841* (2013.01); *E02F 3/844* (2013.01); *E02F 9/2045* (2013.01);
(Continued)

(58) Field of Classification Search
CPC . E02F 9/262; E02F 3/841; E02F 3/844; E02F 9/2045; G05D 1/0212
(Continued)

(56) References Cited

U.S. PATENT DOCUMENTS 6,181,999 B1 *  1/2001  Yamamoto .............. E02F 3/844
172/4.5
8,639,393 B2 *  1/2014  Taylor ................... E02F 9/2045
701/2

(Continued)

FOREIGN PATENT DOCUMENTS

JP         10-88612 A      4/1998
JP        2001-303620 A   10/2001

OTHER PUBLICATIONS

The International Search Report for the corresponding international application No. PCT/JP2018/043226, dated Jan. 29, 2019.
(Continued)

*Primary Examiner* — Yazan A Soofi
(74) *Attorney, Agent, or Firm* — Global IP Counselors, LLP

(57) ABSTRACT

A controller for a work machine acquires current topography data indicating a current topography to be worked. The controller determines a target design topography based on the current topography. The target design topography indicates a target trajectory of a work implement. The controller generates a command signal to operate the work implement to excavate the current topography according to the target design topography. The controller acquires excavated topography data indicating a current topography that has been excavated. The controller modifies the target design topography to move the target design topography upwardly based on the excavated current topography.

20 Claims, 11 Drawing Sheets

(51) Int. Cl.
*E02F 9/20* (2006.01)
*G05D 1/02* (2020.01)

(52) U.S. Cl.
CPC ... *G05D 1/0212* (2013.01); *G05D 2201/0202* (2013.01)

(58) Field of Classification Search
USPC .......................................................... 701/50
See application file for complete search history.

(56) References Cited

U.S. PATENT DOCUMENTS

| | | | |
|---|---|---|---|
| 2014/0180547 A1* | 6/2014 | Edara ................... | E02F 9/205 701/50 |
| 2014/0277957 A1* | 9/2014 | Clar ..................... | E02F 9/2045 701/50 |
| 2016/0076222 A1* | 3/2016 | Taylor ................... | E02F 9/205 701/50 |
| 2016/0076223 A1* | 3/2016 | Wei ...................... | E02F 9/205 701/50 |
| 2016/0258129 A1* | 9/2016 | Wei ...................... | E02F 9/2029 |
| 2017/0153717 A1* | 6/2017 | Moore ................. | G06F 3/0354 |
| 2019/0024340 A1* | 1/2019 | Ono ..................... | E02F 3/765 |
| 2021/0148091 A1* | 5/2021 | Takaoka ................ | E02F 3/841 |

OTHER PUBLICATIONS

Examination report No. 1 for the corresponding Australian application No. 2018384989, dated Oct. 29, 2020.

* cited by examiner

CONTROL SYSTEM FOR WORK MACHINE, METHOD, AND WORK MACHINE

CROSS-REFERENCE TO RELATED APPLICATIONS

This application is a U.S. National stage application of International Application No. PCT/JP2018/043226, filed on Nov. 22, 2018. This U.S. National stage application claims priority under 35 U.S.C. § 119(a) to Japanese Patent Application No. 2017-239774, filed in Japan on Dec. 14, 2017, the entire contents of which are hereby incorporated herein by reference.

BACKGROUND

Fields of the Invention

The present invention relates to a control system for a work machine, a method and a work machine.

Background Information

Conventionally, a system for automatically controlling a work machine, such as a bulldozer or a grader, has been proposed in order to work efficiently. For example, in U.S. Pat. No. 8,639,393, the controller presets a target profile along which a work implement is to operate at a work site from a topography at the work site or the like, and operates the work implement along the target profile.

SUMMARY

With the aforementioned conventional system, even an inexperienced operator can perform work efficiently. With the conventional system, however, the work implement cannot necessarily be operated along the target profile. For example, the work implement may not reach the target profile due to a factor such as soil hardness, machine capacity of the work machine or the like. In this case, the topography that has actually been excavated by the work implement may deviate from the target profile. If the work is continued, unevenness may be formed on the topography. This reduces work quality or work efficiency. It is an object of the present invention to solve the above problem.

A control system according to a first aspect is a control system for a work machine including a work implement. The control system includes a controller. The controller is programmed to execute the following processing. The controller acquires current topography data indicating a current topography to be worked. The controller determines a target design topography based on the current topography. The target design topography indicates a target trajectory of the work implement. The controller generates a command signal to operate the work implement so as to excavate the current topography according to the target design topography. The controller acquires excavated topography data indicating an excavated current topography. The controller modifies the target design topography so as to move the target design topography upwardly based on the excavated current topography.

A method according to a second aspect is a method executed by a controller for controlling a work machine including a work implement. The method includes the following processing. A first process is to acquire current topography data indicating a current topography to be worked. A second process is to determine a target design topography indicating a target trajectory of the work implement based on the current topography. A third process is to generate a command signal to operate the work implement so as to excavate the current topography according to the target design topography. A fourth process is to acquire excavated topography data indicating an excavated current topography. A fifth process is to modify the target design topography so as to move the target design topography upwardly based on the excavated current topography.

A work machine according to a third aspect is a work machine including a work implement and a controller. The controller is programmed to execute the following processing. The controller acquires current topography data indicating a current topography to be worked. The controller determines a target design topography based on the current topography. The target design topography indicates a target trajectory of the work implement. The controller generates a command signal to operate the work implement so as to excavate the current topography according to the target design topography. The controller acquires excavated topography data indicating an excavated current topography. The controller modifies the target design topography so as to move the target design topography upwardly based on the excavated current topography.

Advantageous Effects of Invention

According to the present invention, the target design topography is modified so as to move the target design topography upwardly based on the excavated current topography. Therefore, when the work implement cannot reach the initially set target design topography due to a factor such as soil hardness, machine capacity of the work machine or the like, a position of the target design topography is modified upwardly. This allows the work implement to accurately operate according to the target design topography. As a result, a reduction in work quality and work efficiency can be prevented.

DESCRIPTION OF EMBODIMENTS

Figure 1:
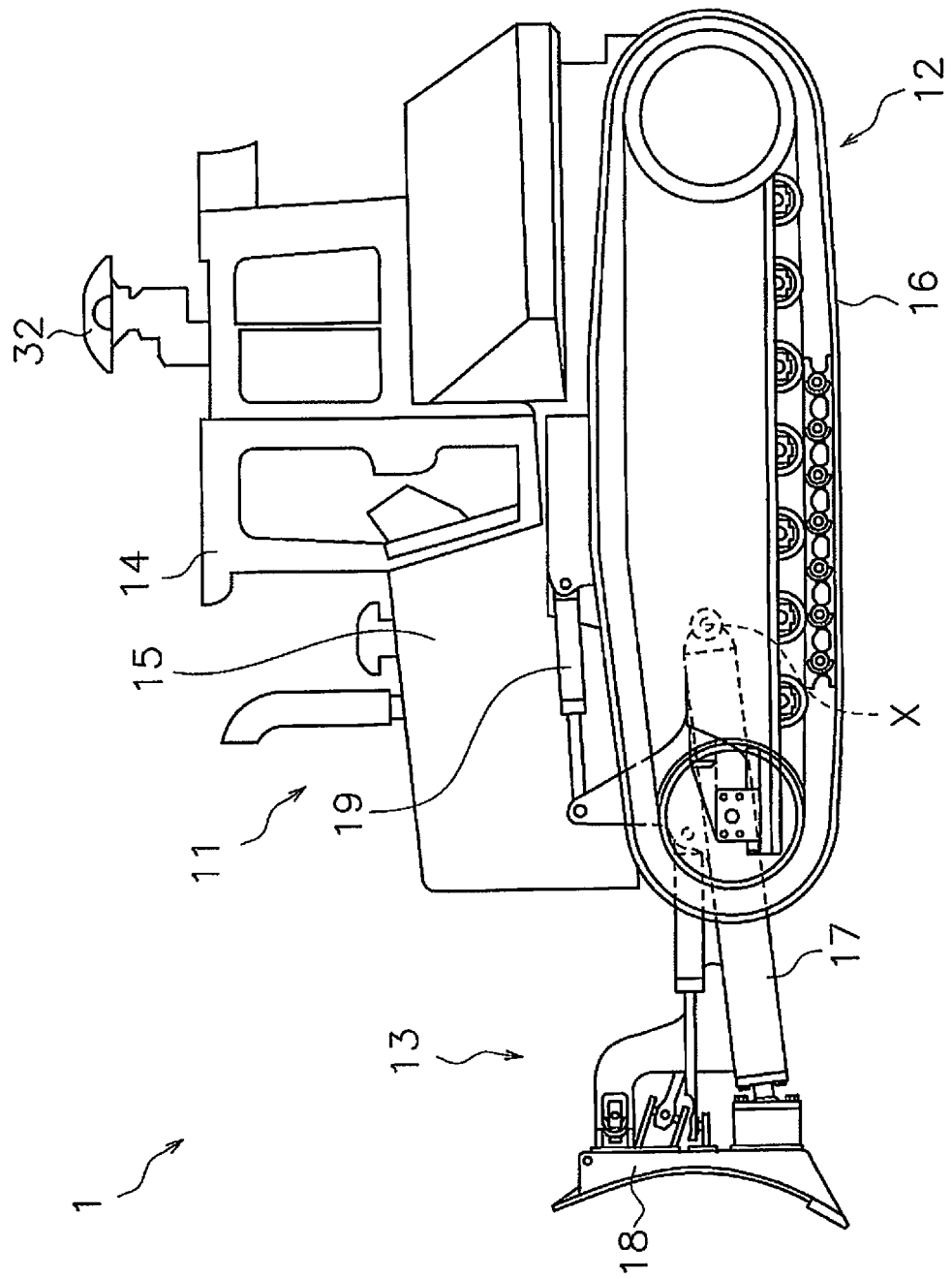
FIG. 1 is a side view of a work machine according to an embodiment.

A work machine according to an embodiment will now be described with reference to the drawings. FIG. 1 is a side view of a work machine 1 according to the embodiment. The work machine 1 according to the present embodiment is a bulldozer. The work machine 1 includes a vehicle body 11, a travel device 12, and a work implement 13.

The vehicle body 11 includes an operating cabin 14 and an engine compartment 15. An operator's seat that is not illustrated is disposed in the operating cabin 14. The engine compartment 15 is disposed in front of the operating cabin 14. The travel device 12 is attached to a bottom portion of the vehicle body 11. The travel device 12 includes a pair of right and left crawler belts 16. Only the left crawler belt 16 is illustrated in FIG. 1. The work machine 1 travels due to the rotation of the crawler belts 16.

The work implement 13 is attached to the vehicle body 11. The work implement 13 includes a lift frame 17, a blade 18, and a lift cylinder 19.

The lift frame 17 is attached to the vehicle body 11 so as to be movable up and down around an axis X extending in the vehicle width direction. The lift frame 17 supports the blade 18. The blade 18 is disposed in front of the vehicle body 11. The blade 18 moves up and down as the lift frame 17 moves up and down. The lift frame 17 may be attached to the travel device 12.

The lift cylinder 19 is coupled to the vehicle body 11 and the lift frame 17. Due to the extension and contraction of the lift cylinder 19, the lift frame 17 rotates up and down around the axis X.

Figure 2:
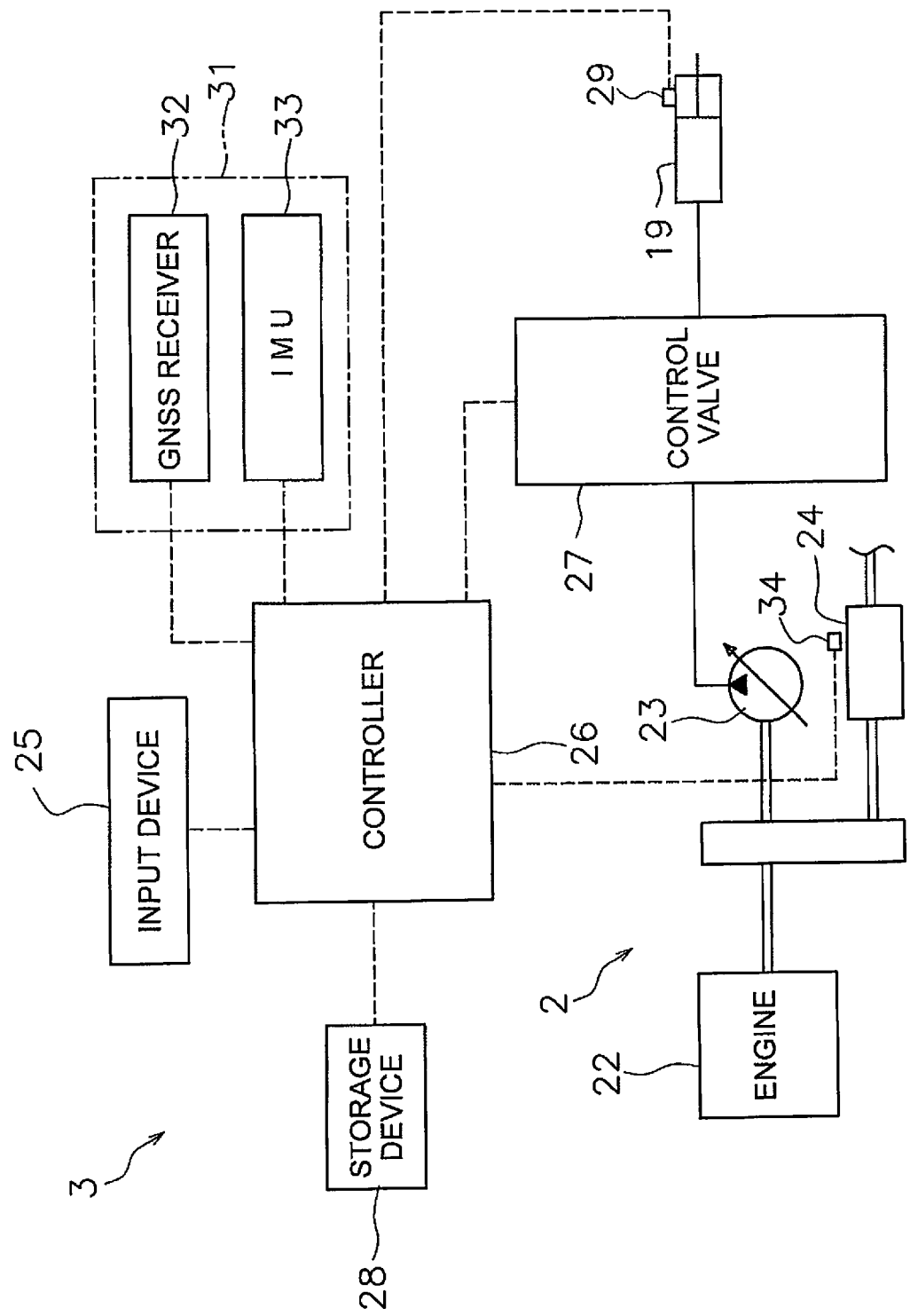
FIG. 2 is a block diagram of a configuration of a drive system and a control system of the work machine.

FIG. 2 is a block diagram of a configuration of a drive system 2 and a control system 3 of the work machine 1. As illustrated in FIG. 2, the drive system 2 includes an engine 22, a hydraulic pump 23, and a power transmission device 24.

The hydraulic pump 23 is driven by the engine 22 to discharge hydraulic fluid. The hydraulic fluid discharged from the hydraulic pump 23 is supplied to the lift cylinder 19. Although only one hydraulic pump 23 is illustrated in FIG. 2, a plurality of hydraulic pumps may be provided.

The power transmission device 24 transmits driving force of the engine 22 to the travel device 12. The power transmission device 24 may be a hydro static transmission (HST), for example. Alternatively, the power transmission device 24 may be, for example, a torque converter or a transmission having a plurality of transmission gears.

The control system 3 includes an input device 25, a controller 26, a storage device 28, and a control valve 27. The input device 25 is disposed in the operating cabin 14. The input device 25 is a device for setting automatic control of the work machine 1 described later. The input device 25 receives an operation by an operator, and outputs an operation signal corresponding to the operation. The operation signal of the input device 25 is output to the controller 26.

The input device 25 includes, for example, a touch screen type display. The input device 25 is not limited to the touch screen type, and may include hardware keys. The input device 25 may be disposed at a location (for example, a control center) that is away from the work machine 1. The operator may operate the work machine 1 via wireless communication from the input device 25 in the control center.

The controller 26 is programmed to control the work machine 1 based on the acquired data. The controller 26 includes, for example, a processor such as a CPU. The controller 26 acquires an operation signal from the input device 25. The controller 26 is not limited to one unit and may be divided into a plurality of controllers. The controller 26 causes the work machine 1 to travel by controlling the travel device 12 or the power transmission device 24. The controller 26 moves the blade 18 up and down by controlling the control valve 27.

The control valve 27 is a proportional control valve and is controlled by a command signal from the controller 26. The control valve 27 is disposed between a hydraulic actuator, such as the lift cylinder 19, and the hydraulic pump 23. The control valve 27 controls the flow rate of the hydraulic fluid supplied from the hydraulic pump 23 to the lift cylinder 19. The controller 26 generates a command signal to the control valve 27 so that the blade 18 operates. As a result, the lift cylinder 19 is controlled. The control valve 27 may be a pressure proportional control valve. Alternatively, the control valve 27 may be an electromagnetic proportional control valve.

Figure 3:
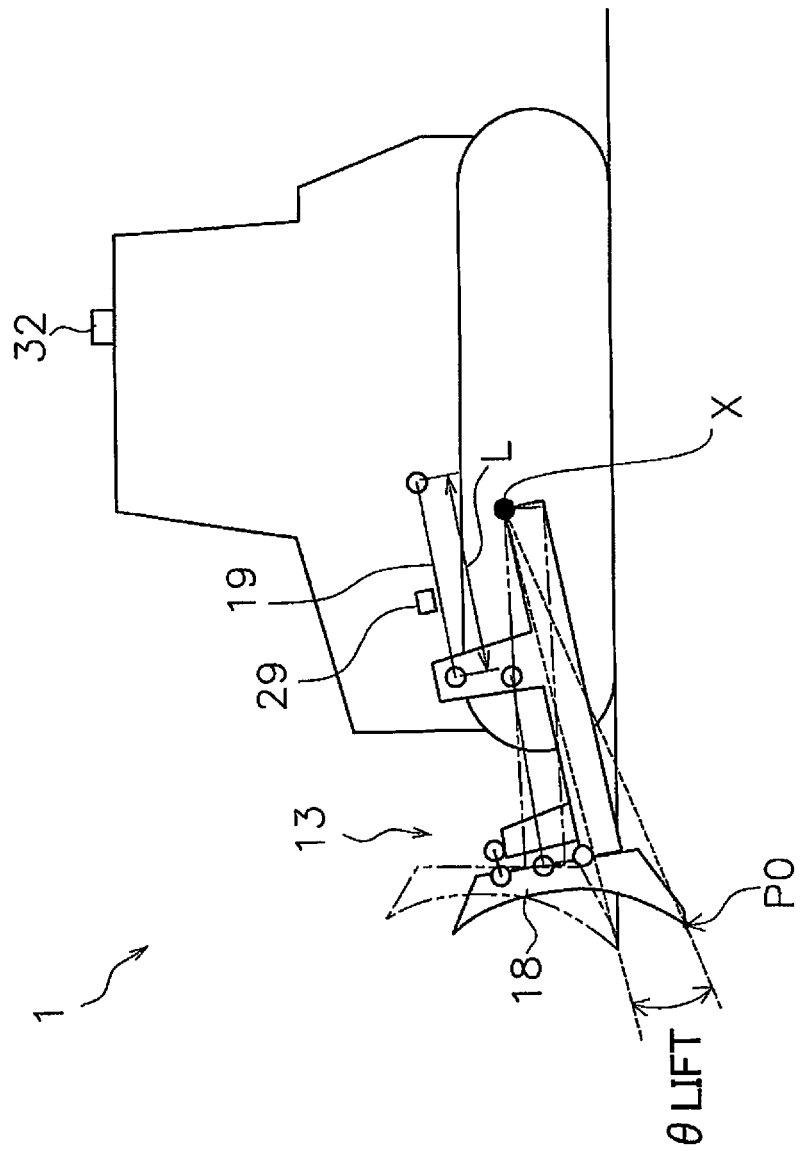
FIG. 3 is a schematic view of a configuration of the work machine.

The control system 3 includes a work implement sensor 29. The work implement sensor 29 senses a position of the work implement and outputs a work implement position signal indicating a position of the work implement. The work implement sensor 29 may be a displacement sensor that senses the displacement of the work implement 13. Specifically, the work implement sensor 29 senses the stroke length of the lift cylinder 19 (hereinafter referred to as "lift cylinder length L"). As illustrated in FIG. 3, the controller 26 calculates a lift angle θlift of the blade 18 based on the lift cylinder length L. FIG. 3 is a schematic view illustrating a configuration of the work machine 1. The work implement sensor 29 may be a rotation sensor that directly senses a rotation angle of the work implement 13.

In FIG. 3, a reference position of the work implement 13 is indicated by a chain double-dashed line. The reference position of the work implement 13 is a position of the blade 18 in a state where the tip of the blade 18 is in contact with the ground surface on a horizontal ground surface. The lift angle θlift is the angle from the reference position of the work implement 13.

As illustrated in FIG. 2, the control system 3 includes a position sensor 31. The position sensor 31 measures a position of the work machine 1. The position sensor 31 includes a global navigation satellite system (GNSS) receiver 32 and an inertial measurement unit (IMU) 33. The GNSS receiver 32 is, for example, a receiver for global positioning system (GPS). For example, an antenna of the GNSS receiver 32 is disposed on the operating cabin 14. The GNSS receiver 32 receives a positioning signal from a satellite and calculates a position of the antenna based on the positioning signal to generate vehicle body position data. The controller 26 acquires the vehicle body position data from the GNSS receiver 32. The controller 26 acquires the traveling direction and vehicle speed of the work machine 1 from the vehicle body position data. The vehicle body position data may not be data of the antenna position. The vehicle body position data may be data indicating the position of any location whose relationship with the antenna position is fixed in the work machine 1 or at the surroundings of the work machine 1.

The IMU 33 is an inertial measurement unit. The IMU 33 acquires vehicle body inclination angle data. The vehicle body inclination angle data includes an angle (pitch angle) with respect to the horizontal in the vehicle longitudinal direction and an angle (roll angle) with respect to the horizontal in the vehicle lateral direction. The controller 26 acquires the vehicle body inclination angle data from the IMU 33.

The controller 26 calculates a blade tip position P0 from the lift cylinder length L, the vehicle body position data, and the vehicle inclination angle data. As illustrated in FIG. 3, the controller 26 calculates global coordinates of the GNSS receiver 32 based on the vehicle body position data. The controller 26 calculates the lift angle θlift based on the lift cylinder length L. The controller 26 calculates local coordinates of the blade tip position P0 with respect to the GNSS receiver 32 based on the lift angle θlift and vehicle body dimension data. The vehicle body dimension data is stored in the storage device 28 and indicates a position of the work implement 13 with respect to the GNSS receiver 32. The controller 26 calculates the global coordinates of the blade tip position P0 based on the global coordinates of the GNSS receiver 32, the local coordinates of the blade tip position P0, and the vehicle body inclination angle data. The controller 26 acquires the global coordinates of the blade tip position P0 as blade tip position data.

The control system 3 includes an output sensor 34 that measures an output of the power transmission device 24. When the power transmission device 24 is an HST including a hydraulic motor, the output sensor 34 may be a pressure sensor that senses hydraulic pressure of the hydraulic motor. The output sensor 34 may be a rotation speed sensor that senses an output rotation speed of the hydraulic motor. When the power transmission device 24 includes a torque converter, the output sensor 34 may be a rotation sensor that senses an output rotation speed of the torque converter. A sensing signal indicating a sensed value of the output sensor 34 is output to the controller 26.

The storage device 28 includes, for example, a memory and an auxiliary storage device. The storage device 28 may be a RAM, a ROM, for example. The storage device 28 may be a semiconductor memory, a hard disk or the like. The storage device 28 is an example of a non-transitory computer-readable recording medium. The storage device 28 stores computer commands that are executable by the processor and for controlling the work machine 1.

The storage device 28 stores design topography data and work site topography data. The design topography data indicates a final design topography. The final design topography is a final target shape of a surface of a work site. The design topography data is, for example, a construction drawing in a three-dimensional data format. The work site topography data indicates a topography in a wide area of the work site. The work site topography data is, for example, a current topography survey map in a three-dimensional data format. The work site topography data can be acquired by aerial laser survey, for example.

The controller 26 acquires current topography data. The current topography data indicates a current topography of the work site. The current topography of the work site is a topography of a region along the traveling direction of the work machine 1. The current topography data is acquired by calculation in the controller 26 from the work site topography data, and the position and traveling direction of the work machine 1 acquired from the aforementioned position sensor 31.

The controller 26 automatically controls the work implement 13 based on the current topography data, the design topography data, and the blade tip position data. The automatic control of the work implement 13 may be semi-automatic control performed in combination with manual operation by the operator. Alternatively, the automatic control of the work implement 13 may be fully automatic control performed without manual operation by an operator. The travel of the work machine 1 may be automatically controlled by the controller. For example, the travel control of the work machine 1 may be fully automatic control performed without manual operation by an operator. Alternatively, the travel control may be semi-automatic control performed in combination with manual operation by the operator. Alternatively, the travel of the work machine 1 may be performed with manual operation by the operator.

Figure 4:
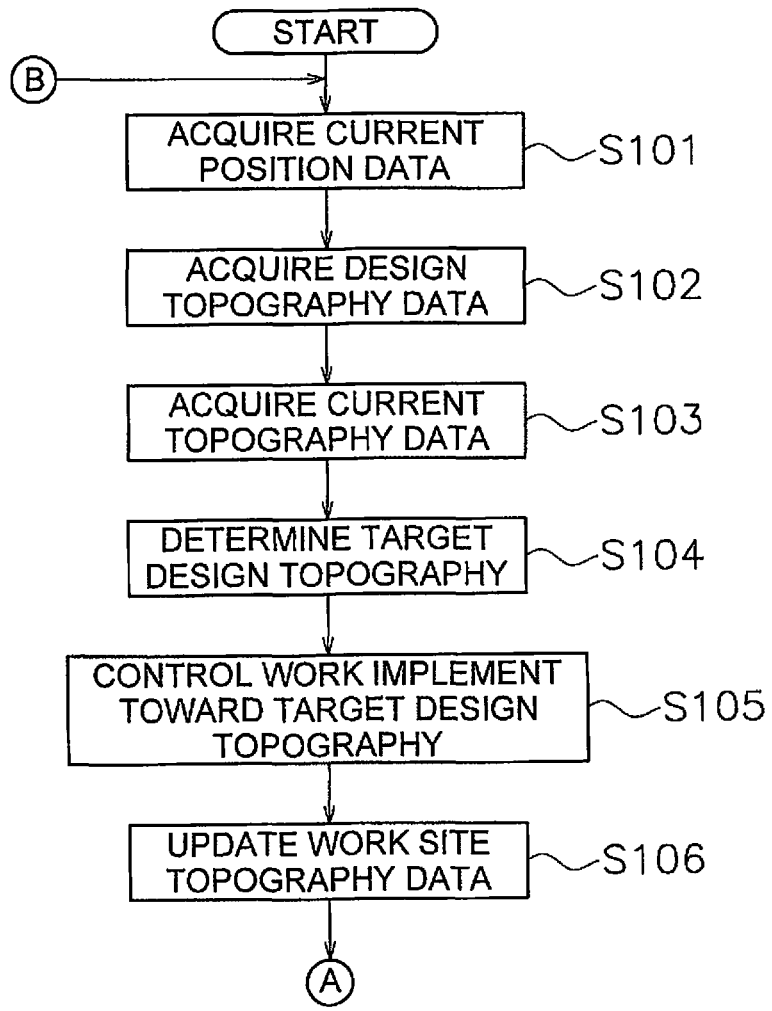
FIG. 4 is a flowchart illustrating processing of automatic control of the work machine.
Figure 6:
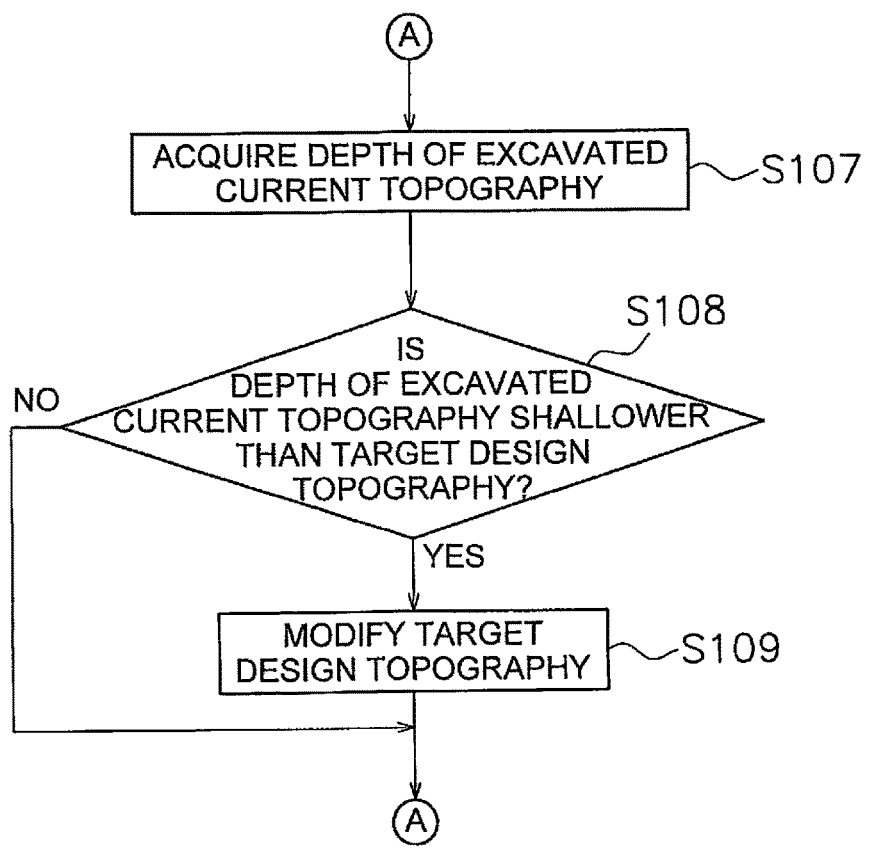
FIG. 6 is a flowchart illustrating processing of automatic control of the work machine.

The automatic control of the work machine 1 in excavating executed by the controller 26 will be described below. FIG. 4 and FIG. 6 are flowcharts illustrating processing of automatic control.

As illustrated in FIG. 4, in step S101, the controller 26 acquires current position data. At this time, the controller 26 acquires the current blade tip position P0 of the blade 18 as described above.

Figure 5:
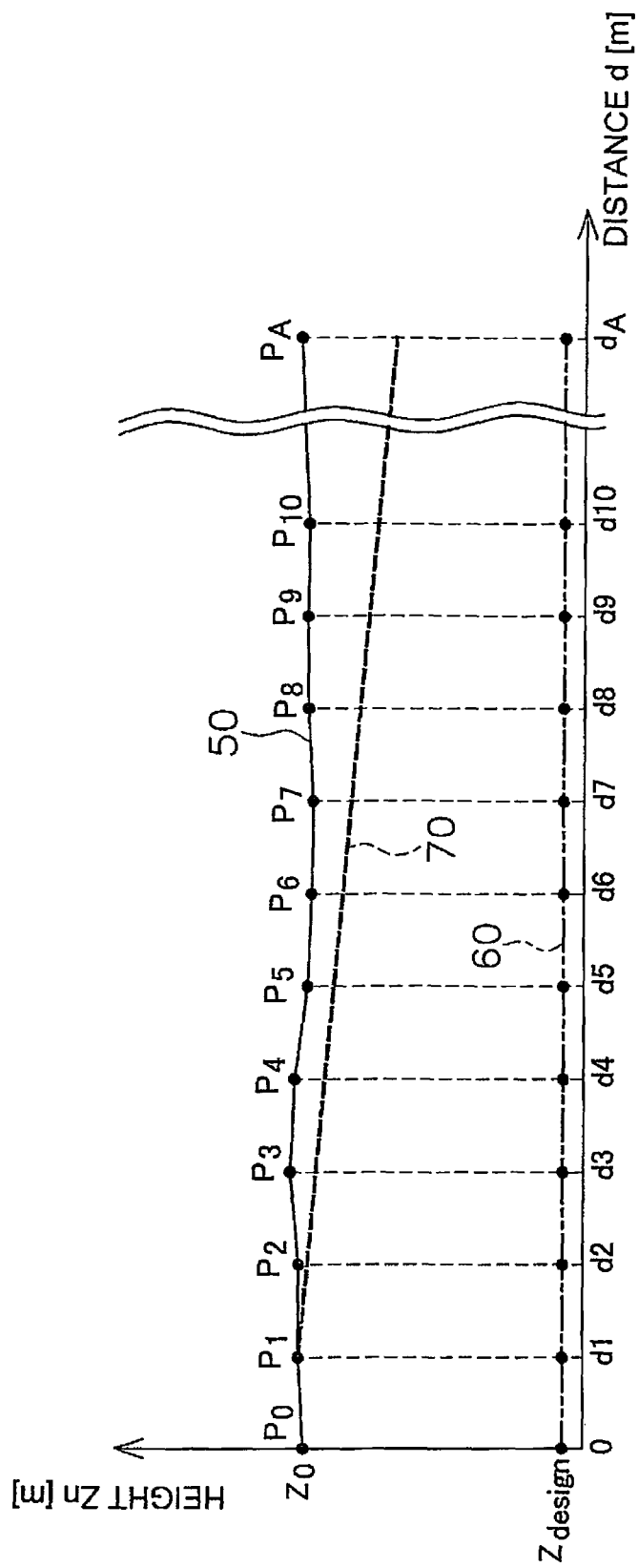
FIG. 5 is a graph illustrating an example of a final design topography, a current topography, and a target design topography.

In step S102, the controller 26 acquires design topography data. As illustrated in FIG. 5, the design topography data includes a height Zdesign of a final design topography 60 at a plurality of reference points Pn (n=0, 1, 2, 3, . . . , A) in the traveling direction of the work machine L The plurality of reference points Pn indicate a plurality of points at a predetermined interval along the traveling direction of the work machine 1. The plurality of reference points Pn are on a travel path of the blade 18. In FIG. 5, the final design topography 60 has a flat shape parallel to the horizontal direction, but may have a different shape.

In step S103, the controller 26 acquires current topography data. The controller 26 acquires the current topography data by calculation from the work site topography data acquired from the storage device 28 and the vehicle body position data and traveling direction data acquired from the position sensor 31.

The current topography data is information indicating a topography positioned in the traveling direction of the work machine 1. FIG. 5 illustrates a cross section of a current topography 50. In FIG. 5, the vertical axis indicates the height of the topography, and the horizontal axis indicates the distance from the current position in the traveling direction of the work machine 1.

Specifically, the current topography data includes the height Zn of the current topography 50 at the plurality of reference points Pn from the current position to a predetermined topography recognition distance dA in the traveling direction of the work machine 1. In the present embodiment, the current position is a position determined based on the current blade tip position P0 of the work machine 1. The current position may be determined based on a current position of another portion of the work machine 1. The plurality of reference points are arranged at a predetermined interval, for example, every one meter.

In step S104, the controller 26 determines target design topography data. The target design topography data indicates a target design topography 70 illustrated by a dashed line in FIG. 5. The target design topography 70 indicates a desired trajectory of the tip of the blade 18 in work. The target design topography 70 is a target profile of the topography to be worked, and indicates a desired shape as a result of the excavating work.

As illustrated in FIG. 5, the controller 26 determines a target design topography 70 of which at least a portion of the target design topography 70 is positioned below the current topography 50. For example, the controller 26 determines the target design topography 70 inclined at a predetermined angle with respect to the horizontal direction. The predetermined angle may be set by the operator. Alternatively, the controller 26 may automatically determine the predetermined angle.

The controller 26 determines the target design topography 70 so that the target design topography 70 does not go below the final design topography 60. Therefore, the controller 26 determines the target design topography 70 positioned at or above the final design topography 60 and below the current topography 50 during the excavating work.

In step S105, the controller 26 controls the blade 18 toward the target design topography 70. At this time, the controller 26 generates a command signal to the work implement 13 so that the tip position of the blade 18 moves toward the target design topography 70 generated in step S104. The generated command signal is input to the control valve 27. As a result, the blade tip position P0 of the work implement 13 moves toward the target design topography 70.

In step S106, the controller 26 updates the work site topography data. The controller 26 updates the work site topography data based on position data indicating the latest trajectory of the blade tip position P0. Alternatively, the controller 26 may calculate the position of the bottom surface of the crawler belts 16 from the vehicle body position data and the vehicle body dimension data, and update the work site topography data from the position data indicating the trajectory of the bottom surface of the crawler belts 16. In this case, the update of the work site topography data can be performed instantly.

Alternatively, the work site topography data may be generated from survey data measured by a survey device outside of the work machine 1. Aerial laser survey may be used as an external survey device, for example. Alternatively, the current topography 50 may be imaged by a camera, and the work site topography data may be generated from the image data captured by the camera. For example, aerial photographic survey using an unmanned aerial vehicle (UAV) may be used. In the case of using the external survey device or the camera, the work site topography data may be updated at a predetermined interval or as needed.

As illustrated in FIG. 6, in step S107, the controller 26 acquires a depth of the current topography 50 that has been excavated. The depth of the excavated current topography 50 is an example of excavated topography data indicating the current topography 50 that has been excavated. The controller 26 acquires the depth of the excavated current topography 50 from the work site topography data updated in step S108. In other words, the controller 26 acquires the depth of the excavated current topography 50 from the updated current topography data.

Figure 7:
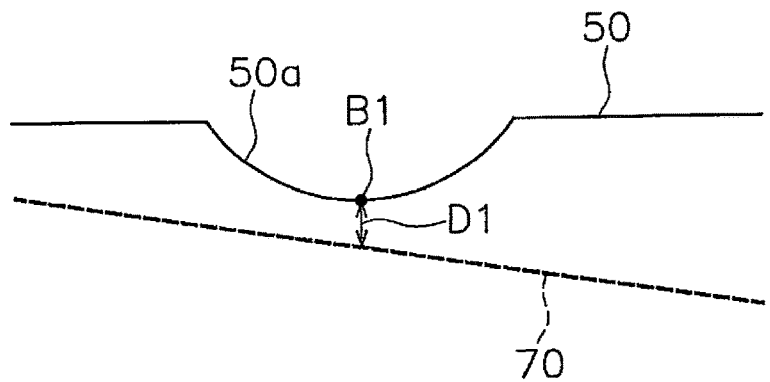
FIG. 7 is a diagram illustrating an example of a method for determining an excavated current topography.

In step S108, the controller 26 determines whether the depth of the excavated current topography 50 is shallower than the target design topography 70. For example, as illustrated in FIG. 7, when a distance D1 between an excavated current topography 50a and the target design topography 70 is equal to or greater than a predetermined threshold in the gravity direction, the controller 26 determines that the depth of the excavated current topography 50a is shallower than the target design topography 70. That is, the controller 26 determines that the depth of the excavated current topography 50a is shallower than the target design topography 70 when the distance D1 between a bottom of the excavated current topography 50a (a lowest point B1) and the target design topography 70 is equal to or greater than the predetermined threshold in the gravity direction.

The predetermined threshold is stored in the storage device 28, and is preset to a value at which the excavated current topography 50a may be regarded to be positioned away from the target design topography 70. The predetermined threshold may be a fixed value. Alternatively, the predetermined threshold may be changeable.

In step S108, when the controller 26 determines that the depth of the excavated current topography 50a is shallower than the target design topography 70, the process proceeds to step S109. In step S109, the controller 26 modifies the target design topography 70 so as to move the target design topography 70 upwardly. The controller 26 modifies the target design topography 70 so as to move the target design topography 70 upwardly according to the depth of the excavated current topography 50a.

Figure 8:
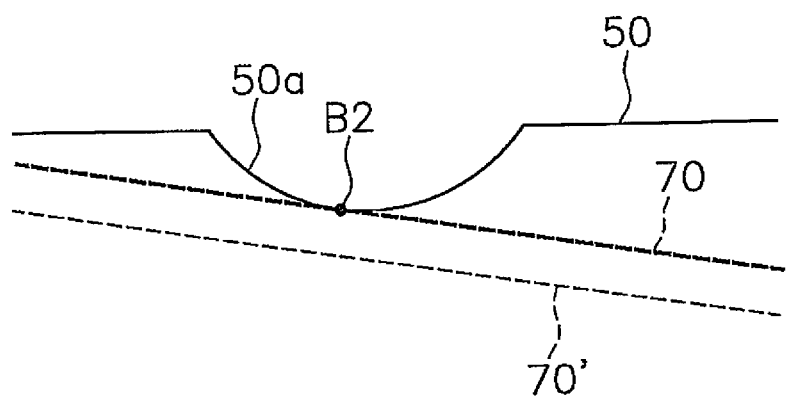
FIG. 8 is a diagram illustrating an example of a modified target design topography.

Specifically, as illustrated in FIG. 8, the controller 26 modifies the target design topography 70 so as to be in contact with the excavated current topography 50a. In FIG. 8, "70'" indicates the target design topography 70 before the modification, and "70" indicates the target design topography 70 after the modification. The controller 26 may modify the target design topography 70 by moving the target design topography 70 in the gravity direction. Alternatively, the controller 26 may modify the target design topography 70 by moving the target design topography 70 in the normal direction of the target design topography 70.

When the target design topography 70 is modified, the controller 26 controls the blade 18 according to the modified target design topography 70. Subsequently, the process returns to step S101. The controller 26 updates the current topography 50 based on the updated work site topography data, and newly determines the target design topography 70 based on the updated current topography 50. Then, the controller 26 controls the blade 18 along the newly determined target design topography 70. This processing is repeated to perform excavating so that the current topography 50 approaches the final design topography 60.

With the control system 3 of the work machine 1 according to the present embodiment as described above, when the depth of the excavated current topography 50a is shallower than the target design topography 70, the target design topography 70 is modified so as to move the target design topography 70 upwardly. Therefore, when the work implement 13 cannot reach the initially set target design topography 70 due to a factor of soil hardness, machine capability of the work machine 1 or the like, the position of the target design topography 70 is modified upwardly. This allows the work implement 13 to accurately operate according to the target design topography. As a result, a reduction in work quality and work efficiency can be prevented.

Although the embodiment of the present invention has been described so far, the present invention is not limited to the above embodiment and various modifications may be made within the scope of the invention.

The work machine 1 is not limited to a bulldozer, and may be another work machine such as a wheel loader, a motor grader, a hydraulic excavator, or the like.

The work machine 1 may be remotely operable. In this case, a portion of the control system 3 may be disposed outside the work machine 1. For example, the controller 26 may be disposed outside the work machine 1. The controller 26 may be disposed in a control center that is away from the work site. In this case, the work machine 1 may be a work machine without the operating cabin 14.

The work machine 1 may be a work machine driven by an electric motor. In this case, a power supply may be disposed outside the work machine 1. The work machine 1 in which the power is supplied from the outside may be a work machine without an internal combustion engine 22 and the engine compartment.

Figure 9:
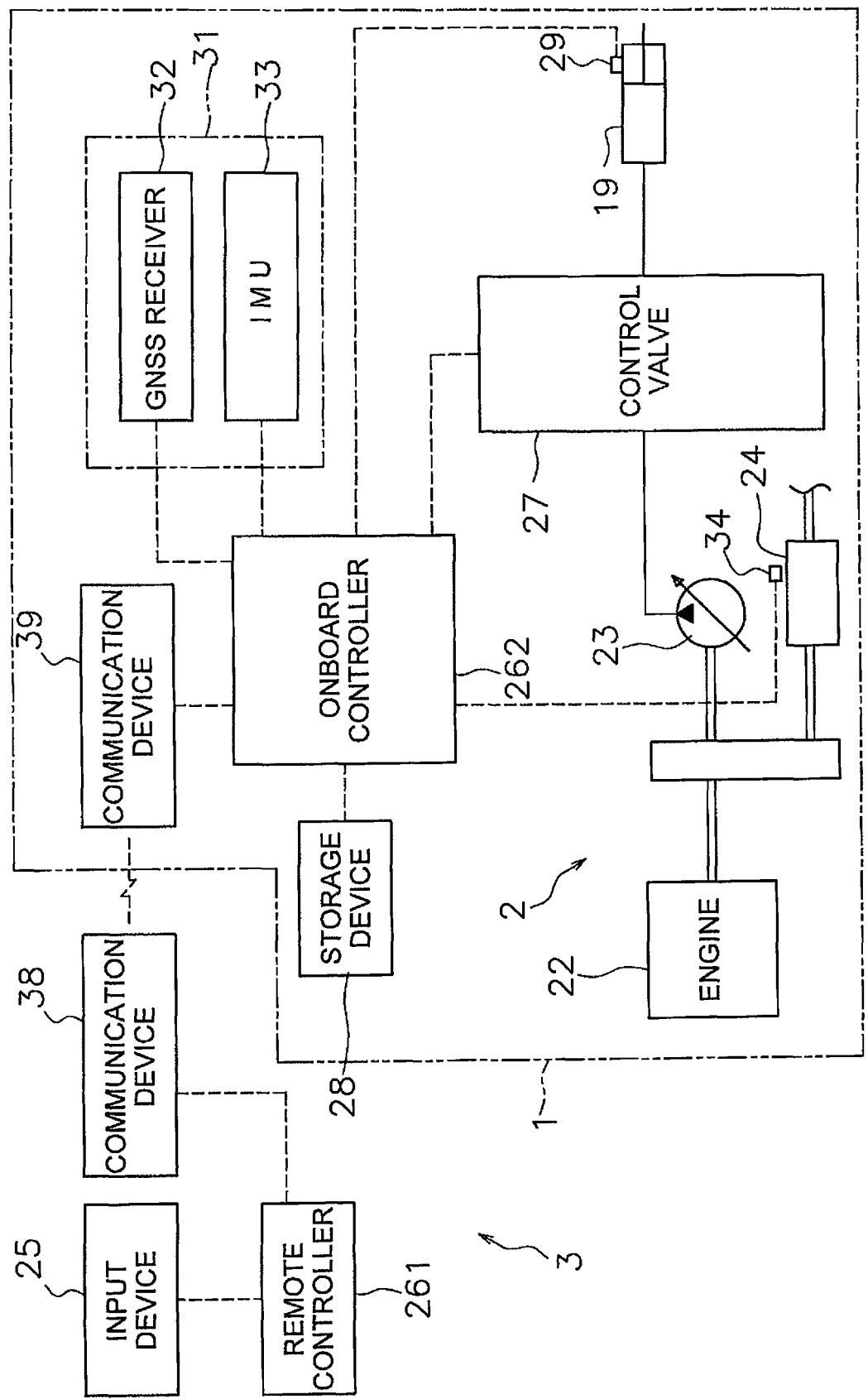
FIG. 9 is a block diagram of a configuration according to a first modified example of the control system.

The controller 26 may have a plurality of controllers 26 separated from one another. For example, as illustrated in FIG. 9, the controller 26 may include a remote controller 261 disposed outside of the work vehicle 1 and an onboard controller 262 mounted on the work vehicle 1. The remote controller 261 and the onboard controller 262 may be able to communicate wirelessly via communication devices 38 and 39. Some of the aforementioned functions of the controller 26 may be executed by the remote controller 261, and the remaining functions may be executed by the onboard controller 262. For example, the processing for determining the target design topography 70 may be executed by the remote controller 261, and the processing for outputting a command signal to the work implement 13 may be executed by the onboard controller 262.

The input device 25 may be disposed outside the work machine 1. In this case, the operating cabin may be omitted from the work machine 1. Alternatively, the input device 25 may be omitted from the work machine 1. The input device 25 may include an operating element such as a control lever, a pedal, a switch, or the like for operating the travel device 12 and/or the work implement 13. The traveling back and forth of the work vehicle 1 may be controlled according to the operation of the input device 25. The movement such as raising and lowering of the work implement 13 may be controlled according to the operation of the input device 25.

Figure 10:
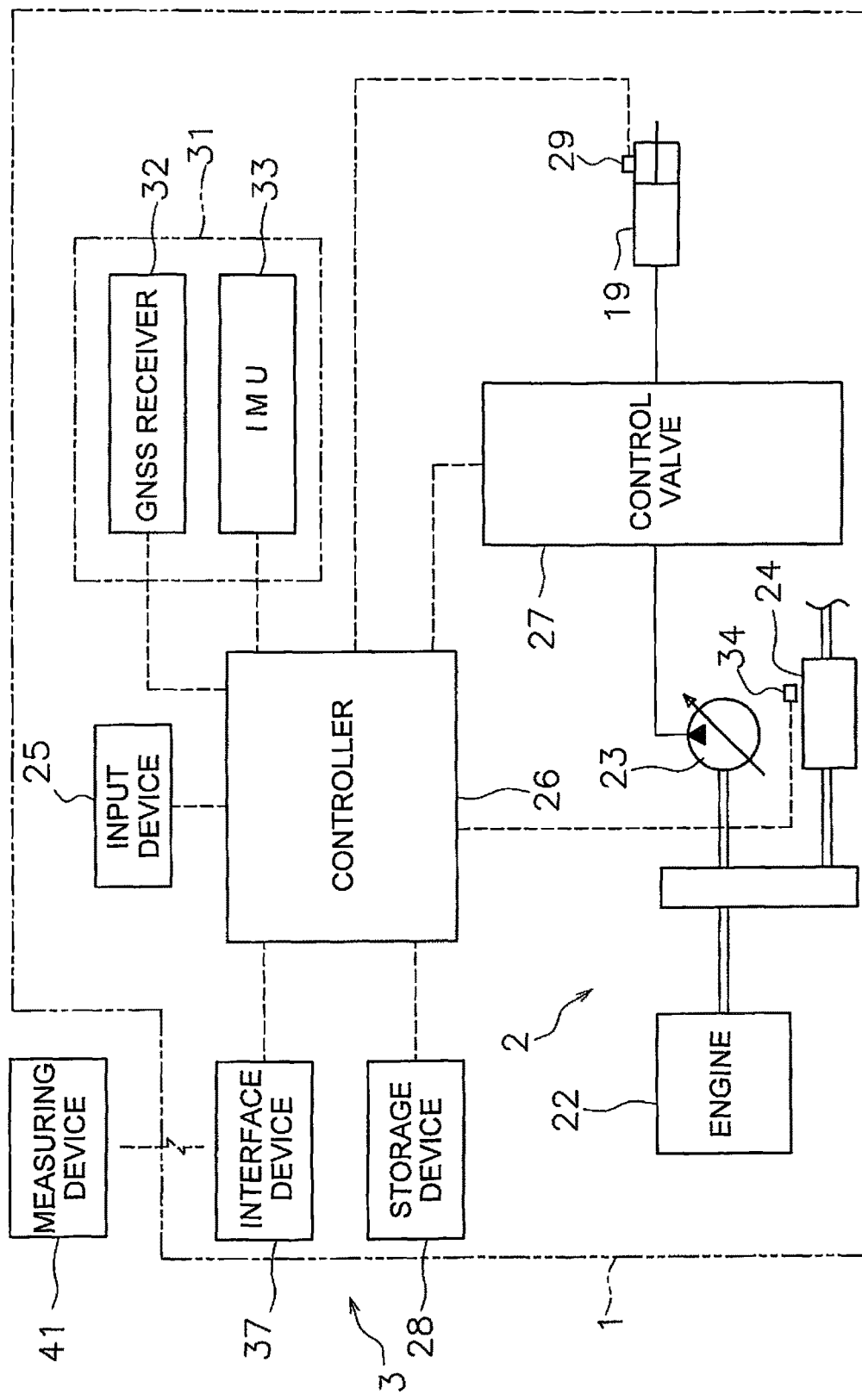
FIG. 10 is a block diagram of a configuration according to a second modified example of the control system.

The current topography 50 may be acquired by another device, instead of the aforementioned position sensor 31. For example, as illustrated in FIG. 10, the current topography 50 may be acquired by an interface device 37 that receives data from an external device. The interface device 37 may wirelessly receive data of the current topography 50 measured by an external measuring device 41. Alternatively, the interface device 37 may be a recording medium reading device and may receive data of the current topography 50 measured by the external measuring device 41 via the recording medium.

Figure 11:
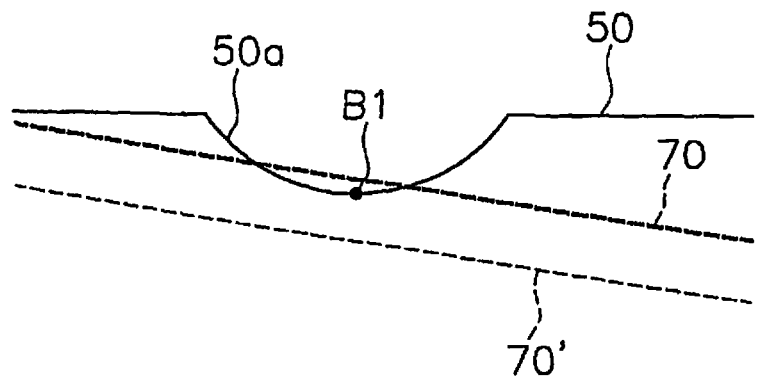
FIG. 11 is a diagram illustrating another example of the modified target design topography.

The method for modifying the target design topography 70 is not limited to that of the above embodiment, and may be changed. For example, as illustrated in FIG. 11, when the depth of the excavated current topography 50a is shallower than the target design topography 70, the controller 26 may modify the target design topography 70 so as to pass through a position at or above the lowest point B1 of the excavated current topography 50a. In FIG. 11, the target design topography 70 is modified so as to pass through a position above the lowest point B1 of the excavated current topography 50a. However, the target design topography 70 may be modified to pass through a position at the same height as the lowest point B1 of the excavated current topography 50a. That is, the target design topography 70 may be modified so as to pass through the lowest point B1 of the excavated current topography 50a.

As illustrated in FIG. 11, the lowest point B1 may be a point positioned at the lowest of the excavated current topography 50a in the gravity direction. Alternatively, the lowest point B1 may be a point positioned closest to the excavated current topography 50a in the normal direction of the target design topography 70 (a contact point B2 in FIG. 8).

In the above embodiment, the controller 26 determines whether the depth of the excavated current topography 50a is shallower than the target design topography 70 in the gravity direction. However, the method for determining that the depth of the excavated current topography 50a is shallower than the target design topography 70 is not limited to that of the above embodiment, and may be changed.

Figure 12:
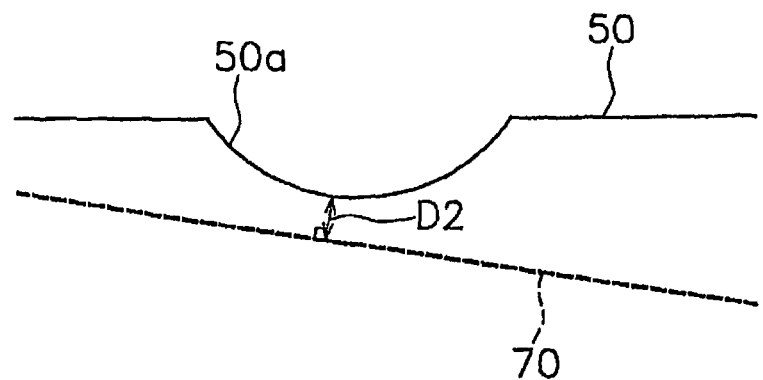
FIG. 12 is a diagram illustrating a first modified example of a method for determining the excavated current topography.

For example, FIG. 12 is a diagram illustrating a first modified example of the determination method. As illustrated in FIG. 12, the controller 26 may determine that the depth of the excavated current topography 50a is shallower than the target design topography 70 when a distance D2 between the excavated current topography 50a and the target design topography 70 is equal to or greater than a predetermined threshold in the normal direction of the target design topography 70.

Figure 13:
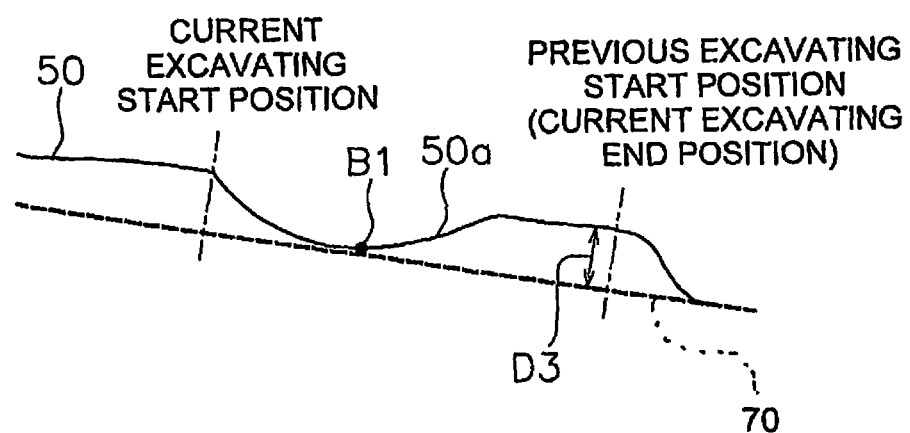
FIG. 13 is a diagram illustrating a second modified example of a method for determining the excavated current topography.

FIG. 13 is a diagram illustrating a second modified example of the determination method. As illustrated in FIG. 13, the controller 26 may determine that the depth of the excavated current topography 50a is shallower than the target design topography 70 when a distance D3 between the excavated current topography 50a and the target design topography 70 is equal to or greater than a predetermined threshold at a position farthest from the target design topography 70 between a current excavating end position or a previous excavating start position and the lowest point B1 of the excavated current topography 50a.

The excavating start position and/or the excavating end position may be set by the input device 25. The excavating start position and/or the excavating end position may be automatically determined by the controller 26. For example, the excavating start position and/or the excavating end position may be determined according to the machine performance of the work machine 1. Alternatively, the excavating start position may be a position away from the excavating end position set by the input device 25 by a predetermined distance. Alternatively, the excavating start position may be a position away from the excavating start position set by the input device 25 by a predetermined distance.

Figure 14:
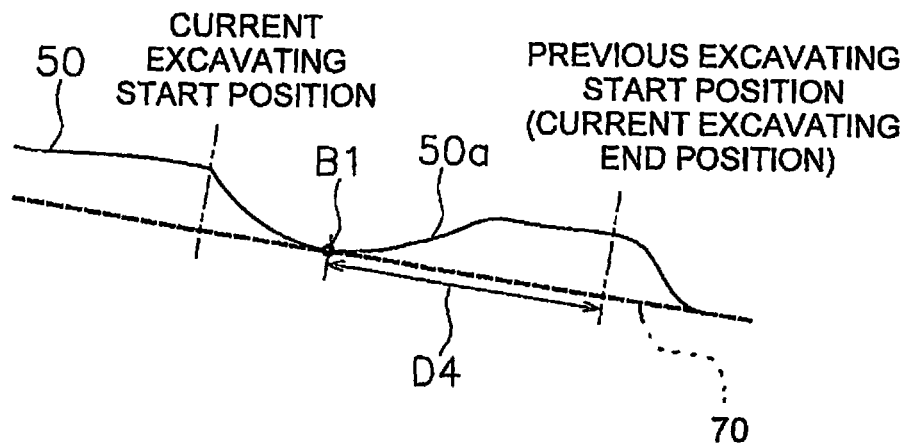
FIG. 14 is a diagram illustrating a third modified example of a method for determining the excavated current topography.

FIG. 14 is a diagram illustrating a third modified example of the determination method. As illustrated in FIG. 14, the controller 26 may determine that the depth of the excavated current topography 50a is shallower than the target design topography 70 when a distance D4 of a portion along the target design topography above the target design topography 70 between the current excavating end position or the previous excavating start position and the lowest point B1 of the excavated current topography 50a is equal to or greater than a predetermined threshold.

Figure 15:
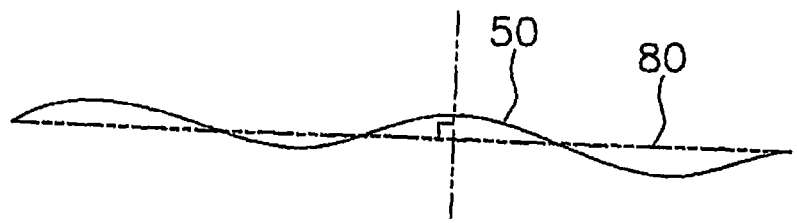
FIG. 15 is a diagram illustrating another example of a method for determining the excavated current topography and a method for modifying the target design topography.

In the above embodiment, the controller 26 determines whether the depth of the excavated current topography 50a is shallower than the target design topography 70 in the gravity direction or in the normal direction of the target design topography 70. However, as illustrated in FIG. 15, the controller may determine whether the depth of the excavated current topography 50a is shallower than the target design topography 70 in the normal direction of an approximate straight line 80 of the current topography 50 before excavating. The controller 26 may modify the target design topography 70 by moving the target design topography 70 in the normal direction of the approximate straight line 80 of the current topography 50 before excavating.

Figure 16:
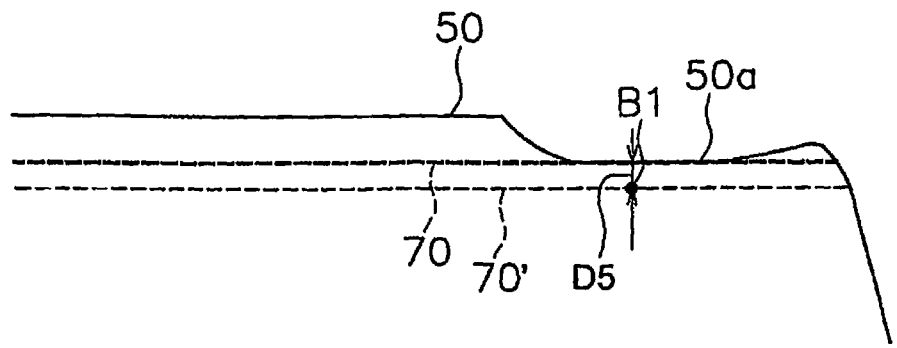
FIG. 16 is a diagram illustrating another example of the target design topography.

The target design topography 70 is not limited to a topography inclined with respect to the horizontal direction as described in the above embodiment, and may be changed. For example, the target design topography 70 may be acquired by vertically displacing the current topography 50 by a predetermined distance. As illustrated in FIG. 16, the target design topography 70 may be parallel to the horizontal direction.

In FIG. 16, when a distance D5 between the bottom of the excavated current topography 50a (the lowest point B1) and the initial target design topography 70' is equal to or greater than a predetermined threshold in the gravity direction, the controller 26 determines that the depth of the excavated current topography 50a is shallower than the target design topography 70. When the controller 26 determines that the depth of the excavated current topography depth 50a is shallower than the target design topography 70, the controller 26 modifies the target design topography 70 so as to move the initial target design topography 70' upwardly.

In the above embodiment, the excavated topography data indicates the depth of the current topography 50 that has been excavated, and may be data that indicates another parameter indicating the current topography 50 that has been excavated. For example, the excavated topography data may be data indicating the shape of the current topography 50 that has been excavated. The controller 26 calculates a difference between the current topography 50 before excavating and the current topography 50 that has been excavated to determine whether the depth of the excavated current topography 50a is shallower than the target design topography 70 from the difference. Alternatively, the controller 26 may not determine whether the depth of the excavated current topography 50a is shallower than the target design topography 70. For example, the controller 26 may modify the target design topography 70 so as to conform to the excavated current topography 50.

The controller 26 may execute load control in parallel with the control of the work implement 13 according to the aforementioned target design surface. Under the load control, the controller 26 determines whether the load on the work implement 13 is equal to or greater than a predetermined load threshold. The controller 26 raises the work implement 13 when the load on the work implement 13 becomes equal to or greater than the predetermined load threshold. Specifically, the controller 26 acquires the traction force of the work machine and regards the traction force as the load on the work implement 13 to make a determination.

The controller 26 calculates the traction force from a sensed value of the output sensor 34. When the power transmission device 24 of the work machine 1 is an HST, the controller 26 can calculate the traction force from the hydraulic pressure of the hydraulic motor and the rotation speed of the hydraulic motor.

When the power transmission device 24 has a torque converter and a transmission, the controller 26 can calculate the traction force from the output rotation speed of the torque converter. Specifically, the controller 26 calculates the traction force from the following formula (1).

$$F = k \times T \times R/(L \times Z) \quad (1)$$

At this time, F is a traction force, k is a constant, T is a transmission input torque, R is a reduction ratio, L is a crawler belt link pitch, and Z is the number of sprocket teeth. The input torque T is calculated based on the output rotation speed of the torque converter. The method for sensing the traction force is not limited to the aforementioned method, and may be another method.

According to the present invention, it is possible to accurately operate the work implement according to the target design topography. As a result, a reduction in work quality and work efficiency can be prevented.

The invention claimed is:

1. A control system for a work machine including a work implement, the control system comprising:
a controller configured to
acquire current topography data indicating a current topography,
determine a target design topography indicating a target trajectory of the work implement based on the current topography,
generate a command signal to operate the work implement to excavate the current topography according to the target design topography,
acquire excavated topography data indicating an excavated current topography, and
modify the target design topography to move the target design topography upwardly based on the excavated current topography.

2. The control system for a work machine according to claim 1, wherein
the excavated topography data indicates a depth of the excavated current topography, and
the controller is further configured to
determine whether a depth of the excavated current topography is shallower than the target design topography, and
modify the target design topography to move the target design topography upwardly when the depth of the excavated current topography is shallower than the target design topography.

3. The control system for a work machine according to claim 2, wherein
the controller is further configured to modify the target design topography to move the target design topography upwardly according to the depth of the excavated current topography when the depth of the excavated current topography is shallower than the target design topography.

4. The control system for a work machine according to claim 2, wherein
the controller is further configured to modify the target design topography to be in contact with the excavated current topography when the depth of the excavated current topography is shallower than the target design topography.

5. The control system for a work machine according to claim 2, wherein
the controller is further configured to modify the target design topography to pass through a position at or above a lowest point of the excavated current topography when the depth of the excavated current topography is shallower than the target design topography.

6. The control system for a work machine according to claim 2, wherein
the controller is further configured to determine that the depth of the excavated current topography is shallower than the target design topography when a distance between the excavated current topography and the target design topography is equal to or greater than a predetermined threshold in a gravity direction.

7. The control system for a work machine according to claim 2, wherein
the controller is further configured to determine that the depth of the excavated current topography is shallower than the target design topography when a distance between the excavated current topography and the target design topography is equal to or greater than a predetermined threshold in a normal direction of the target design topography.

8. The control system for a work machine according to claim 2, wherein
the controller is further configured to determine that the depth of the excavated current topography is shallower than the target design topography when a distance between the excavated current topography and the target design topography is equal to or greater than a predetermined threshold at a position farthest from the target design topography between a current excavating end position or a previous excavating start position and a lowest point of the excavated current topography.

9. The control system for a work machine according to claim 2, wherein
the controller is further configured to determine that the depth of the excavated current topography is shallower than the target design topography when a distance of a portion along the target design topography, the portion being positioned above the target design topography between a lowest point of the excavated current topography and an excavating end position is equal to or greater than a predetermined threshold.

10. A method executed by a controller for controlling a work machine including a work implement, the method comprising:
acquiring current topography data indicating a current topography to be worked;
determining a target design topography indicating a target trajectory of the work implement based on the current topography;
generating a command signal to operate the work implement to excavate the current topography according to the target design topography;
acquiring excavated topography data indicating an excavated current topography; and
modifying the target design topography to move the target design topography upwardly based on the excavated current topography.

11. The method according to claim 10, wherein
the excavated topography data indicates a depth of the excavated current topography,
the method further comprising
determining whether the depth of the excavated current topography is shallower than the target design topography; and
modifying the target design topography to move the target design topography upwardly when the depth of the excavated current topography is shallower than the target design topography.

12. The method according to claim 11, wherein
the target design topography is modified to move the target design topography upwardly according to the depth of the excavated current topography when the depth of the excavated current topography is shallower than the target design topography.

13. The method according to claim 11, wherein
the target design topography is modified to be in contact with the excavated current topography when the depth of the excavated current topography is shallower than the target designed topography.

14. The method according to claim 11, wherein
the target design topography is modified to pass through a position at or above a lowest point of the excavated current topography when the depth of the excavated current topography is shallower than the target design topography.

15. The method according to claim 11, wherein
the depth of the excavated current topography is determined to be shallower than the target design topography when a distance between the excavated current topography and the target design topography is equal to or greater than a predetermined threshold in a gravity direction.

16. The method according to claim 11, wherein
the depth of the excavated current topography is determined to be shallower than the target design topography when a distance between the excavated current topography and the target design topography is equal to or greater than a predetermined threshold in a normal direction of the target design topography.

17. A work machine comprising:
a work implement; and
a controller configured to control the work implement, the controller being configured to
acquire current topography data indicating a current topography to be worked,
determine a target design topography indicating a target trajectory of the work implement based on the current topography,
generate a command signal to operate the work implement to excavate the current topography according to the target design topography,
acquire excavated topography data indicating an excavated current topography, and
modify the target design topography to move the target design topography upwardly based on the excavated current topography.

18. The work machine according to claim 17, wherein
the excavated topography data indicates a depth of the excavated current topography, and
the controller is further configured to
determine whether the depth of the excavated current topography is shallower than the target design topography, and
modify the target design topography to move the target design topography upwardly when the depth of the excavated current topography is shallower than the target design topography.

19. The work machine according to claim 17, wherein
the controller is further configured to modify the target design topography to move the target design topography upwardly according to the depth of the excavated current topography when the depth of the excavated current topography is shallower than the target design topography.

20. The work machine according to claim 17, wherein
the controller is further configured to modify the target design topography to be in contact with the excavated current topography when the depth of the excavated current topography is shallower than the target design topography.

* * * * *